US006290256B1

(12) United States Patent
McFarland et al.

(10) Patent No.: US 6,290,256 B1
(45) Date of Patent: Sep. 18, 2001

(54) AIR BAG INFLATOR WITH PRESSURE REGULATION

(75) Inventors: Eric R. McFarland; Lloyd G. Green, Jr.; Thomas H. Deming, all of Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/263,435

(22) Filed: Mar. 4, 1999

(51) Int. Cl.[7] ................................................. B60R 21/26
(52) U.S. Cl. ........................ 280/736; 280/741; 280/742; 280/735
(58) Field of Search .................................. 280/735, 736, 280/741, 742; 102/536, 531

(56) References Cited

U.S. PATENT DOCUMENTS

| 3,984,126 |   | 10/1976 | Goetz et al. . |
| 3,986,456 | * | 10/1976 | Doin et al. ............................ 280/150 |
| 4,278,638 | * | 7/1981 | Nilsson et al. .................... 280/736 X |
| 5,236,675 |   | 8/1993 | Swain et al. . |
| 5,437,472 |   | 8/1995 | Kuretake et al. . |
| 5,851,027 | * | 12/1998 | DiGiacomo et al. ................ 280/736 |
| 5,851,028 | * | 12/1998 | Thibodeau ........................... 280/736 |
| 5,951,040 |   | 9/1999 | McFarland et al. . |
| 5,984,352 | * | 11/1999 | Green, Jr. et al. .................... 280/736 |
| 6,019,389 | * | 2/2000 | Burgi et al. ......................... 280/736 |
| 6,032,979 | * | 3/2000 | Mossi et al. ..................... 280/736 X |

FOREIGN PATENT DOCUMENTS

WO9425315   11/1994   (WO) .

OTHER PUBLICATIONS

TRW Presentation to General Motors Dec. 8, 1997.
TRW Presentation to Chrysler Jan. 28, 1997.

* cited by examiner

Primary Examiner—Lanna Mai
Assistant Examiner—Toan To
(74) Attorney, Agent, or Firm—Tarolli, Sundheim, Covell, Tummino & Szabo L.L.P.

(57) ABSTRACT

An apparatus (10) for inflating an inflatable vehicle occupant protection device (14) comprises an inflator housing (20) including first and second end walls (32, 62). An inflation fluid source (140) in the inflator housing (20) is actuatable to provide inflation fluid under pressure. An igniter assembly (80) in the inflator housing (20), for actuating the inflation fluid source (140), includes an igniter housing (82) located between the first and second end walls (62, 32) of the inflator housing and an igniter (92) located in the igniter housing. The first and second end walls (62, 32) of the inflator housing (20) move away from each other upon actuation of the inflation fluid source (140). The igniter housing (82) moves with the second end wall (62) away from the first end wall (32). The igniter assembly (80) further includes a cap (100) on the igniter housing (82) for closing an open end of the igniter housing. The cap (100) bodily moves with the first end wall (32) away from the second end wall (62) and relative to the igniter housing (82) upon actuation of the inflation fluid source (140).

7 Claims, 2 Drawing Sheets

AIR BAG INFLATOR WITH PRESSURE REGULATION

BACKGROUND OF THE INVENTION

1. Technical Field

The present invention relates to an apparatus for inflating an inflatable vehicle occupant protection device.

2. Description of the Prior Art

An inflatable vehicle occupant protection device, such as an air bag, is deployed upon the occurrence of a vehicle crash. The air bag is part of a vehicle occupant protection apparatus which further includes a crash sensor and an inflator. The inflator includes a housing and an inflation fluid source, such as a solid propellant, in the housing. When the crash sensor senses a crash-indicating condition of at least a predetermined threshold level, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

When the inflator is actuated at an elevated ambient temperature, the pressure of the inflation fluid in the inflator housing increases. An inflator must be strong enough structurally to contain these elevated pressures. If the pressure in the inflator housing is thus increased, the mass flow rate of the inflation fluid flowing into the air bag can increase above the desired flow rate. Also, the possibility of such increased pressures may make it unfeasible to use a solid propellant which has a high burn rate exponent, that is, a high sensitivity to pressure variation.

SUMMARY OF THE INVENTION

The present invention is an apparatus for inflating an inflatable vehicle occupant protection device. The apparatus comprises an inflator housing including first and second end walls. An inflation fluid source in the inflator housing is actuatable to provide inflation fluid under pressure. An igniter assembly in the inflator housing, for actuating the inflation fluid source, includes an igniter housing located between the first and second end walls of the inflator housing and an igniter located in the igniter housing for actuating the inflation fluid source. The first and first end walls of the inflator housing move away from each other upon actuation of the inflation fluid source. The igniter housing moves with the second end wall away from the first end wall. The igniter assembly further includes a cap on the igniter housing for closing an open end of the igniter housing. The cap bodily moves with the first end wall away from the second end wall and relative to the igniter housing upon actuation of the inflation fluid source.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENTS

Figure 1:
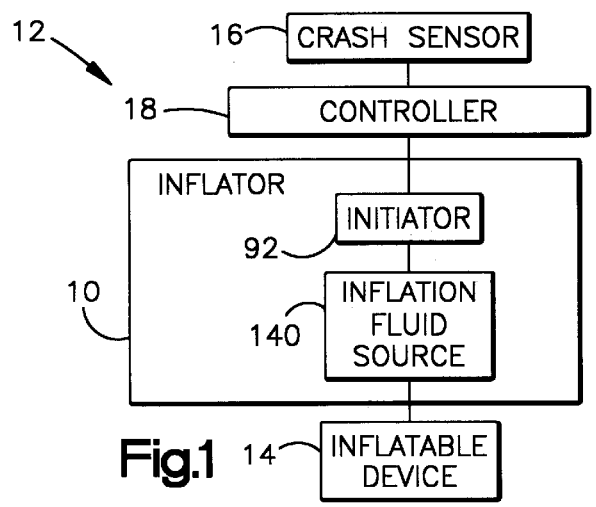
FIG. 1 is a schematic view of a vehicle occupant protection apparatus including an inflator constructed in accordance with a first embodiment of the present invention.

The present invention relates to an apparatus for providing inflation fluid for inflating an inflatable vehicle occupant protection device. As representative of the present invention, FIG. 1 illustrates schematically an inflator 10 which forms part of a vehicle occupant protection apparatus 12.

The apparatus 12 includes an inflatable vehicle occupant protection device 14. In the preferred embodiment of the invention, the protection device 14 is an air bag. Other inflatable vehicle occupant protection devices that can be used in accordance with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 14. When the air bag 14 is inflated, it extends into a vehicle occupant compartment (not shown) to help protect a vehicle occupant from a forceful impact with parts of the vehicle as a result of a crash.

The apparatus 12 also includes a crash sensor 16. The crash sensor 16 is a known device which senses a vehicle condition that indicates the occurrence of a crash. If the vehicle condition sensed by the crash sensor 16 is at or above a predetermined threshold level, it indicates the occurrence of a crash having at least a predetermined threshold level of severity. The threshold level of crash severity is a level at which inflation of the air bag 14 is desired for protection of a vehicle occupant.

The vehicle condition sensed by the crash sensor 16 preferably is sudden vehicle deceleration that is caused by a collision. The magnitude and duration of the deceleration are measured by the crash sensor 16. If the magnitude and duration of the deceleration meet or exceed predetermined threshold levels, they indicate the occurrence of a crash that meets or exceeds the predetermined threshold level of crash severity. A deployment signal is then transmitted to a controller 18 to indicate the occurrence of such a crash. The controller 18 sends an actuation signal to the inflator 10 to actuate the inflator.

Figure 3:
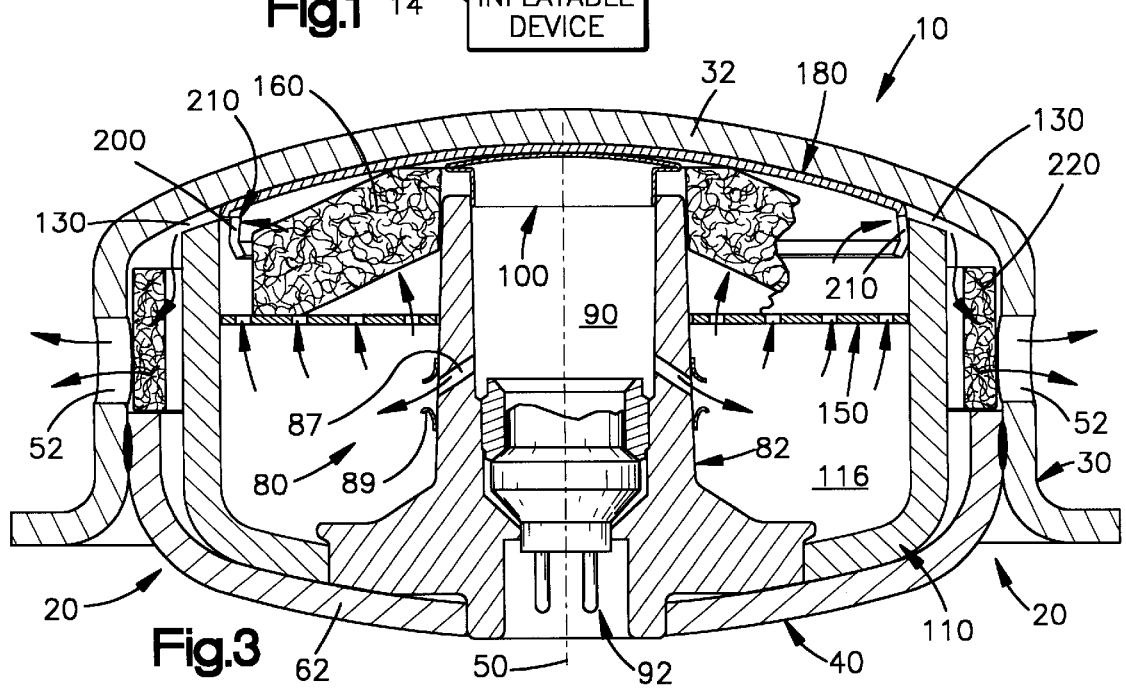
FIG. 3 is a view similar to FIG. 2, showing the inflator in an actuated condition.
Figures 4, 5, 6:
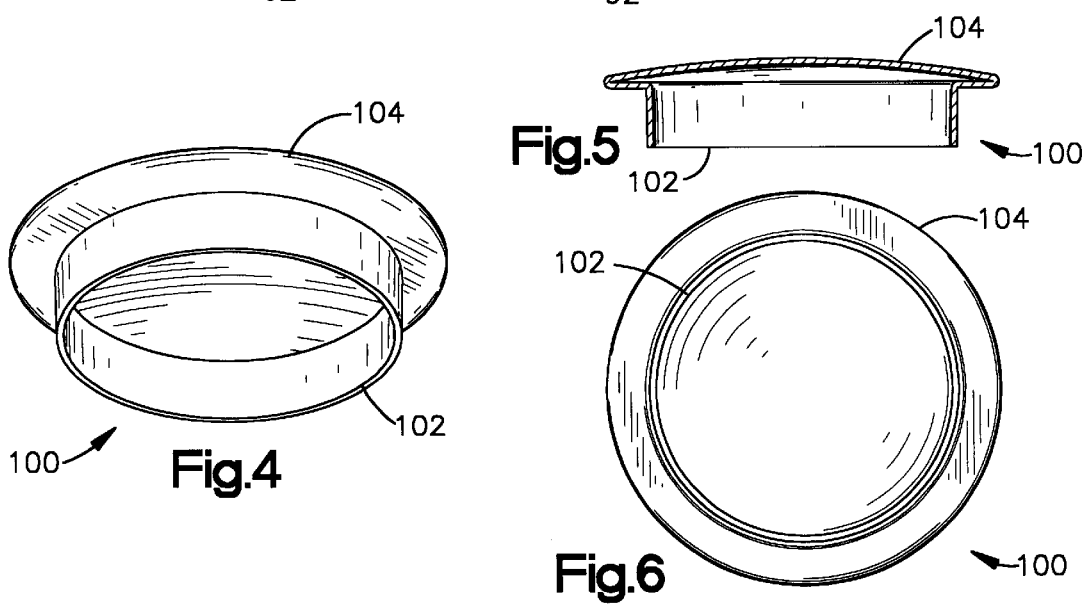
FIG. 4 is a perspective view of an igniter cap which forms part of the inflator of FIG. 2.
FIG. 5 is a sectional view of the igniter cap of FIG. 4.
FIG. 6 is a bottom plan view of the igniter cap of FIG. 4.
Figure 2:
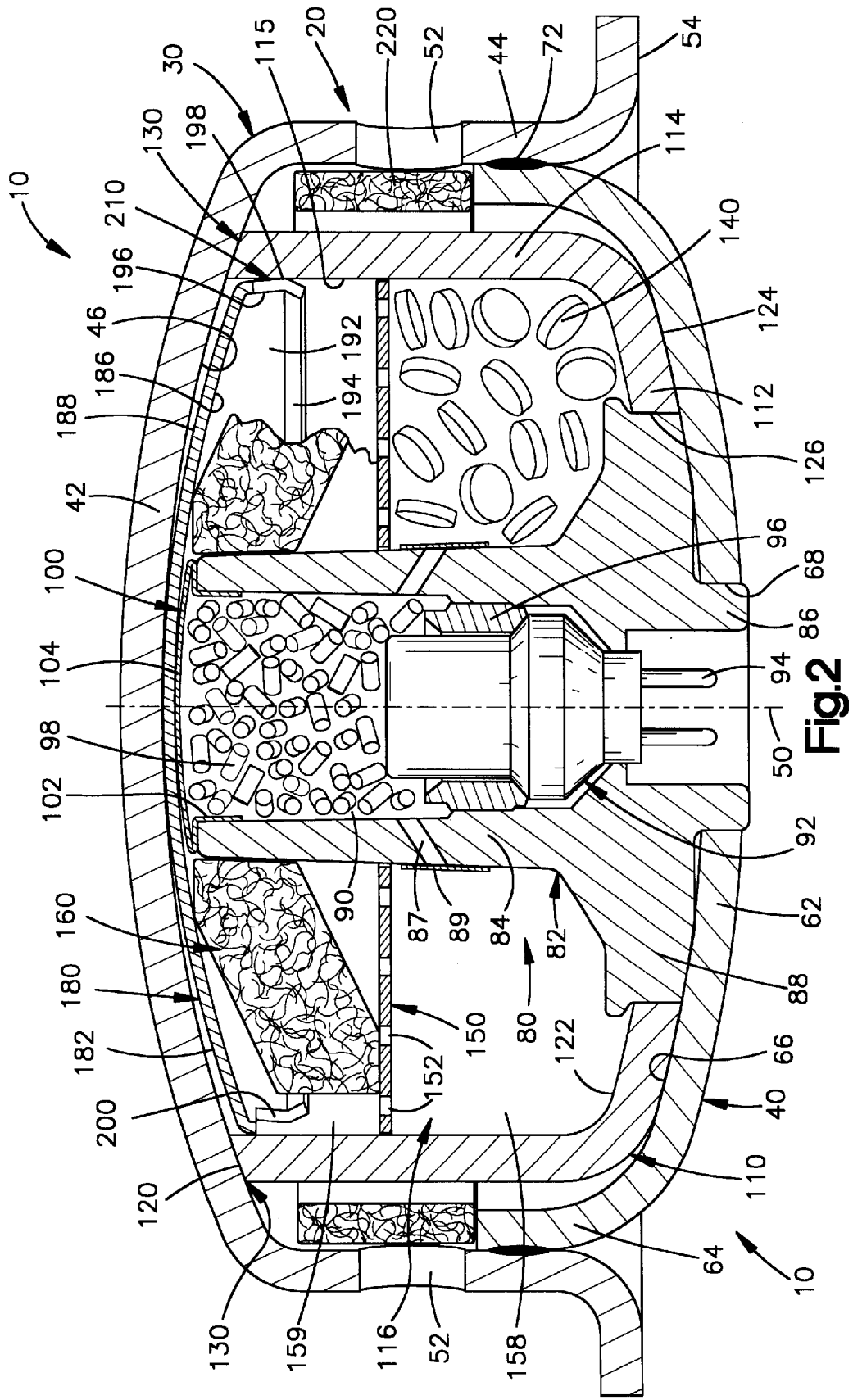
FIG. 2 is a sectional view showing the inflator of FIG. 1 in an unactuated condition.

The inflator 10 (FIGS. 2–3) includes a generally cylindrical housing or shell 20. The inflator 10 has a circular configuration as seen from above in FIGS. 2 and 3. The housing 20 includes a first or upper (as viewed in the drawings) housing part 30, referred to herein as a diffuser, and a second or lower (as viewed in the drawings) housing part 40, referred to herein as a closure.

The diffuser 30 has an inverted, cup-shaped configuration including a radially extending end wall 42 and an axially extending side wall 44. The end wall 42 of the diffuser 30 is domed, that is, has a curved configuration projecting away from the closure 40. The end wall 42 has an inner side surface 46.

The side wall 44 of the upper housing part 30 has a cylindrical configuration centered on an axis 50 of the inflator 10. A plurality of inflation fluid outlets 52 are disposed in a circular array on the side wall 44. Each one of the inflation fluid outlets 52 extends radially through the side wall 44. The outlets 52 enable flow of inflation fluid out of the inflator 10 to inflate the air bag 14. The outlets 52, as a group, have a fixed, predetermined flow area. An annular inflator mounting flange 54 extends radially outward from the side wall 44 at a location below (as viewed in FIG. 2) the inflation fluid outlets 52.

The closure 40 has a cup-shaped configuration including a radially extending end wall 62 and an axially extending side wall 64. The end wall 62 of the closure 40 is domed, that is, has a curved configuration projecting away from the upper housing part 30. The end wall 62 has an inner side surface 66 presented toward the end wall 42 of the upper housing part 30. A circular opening 68 in the end wall 62 is centered on the axis 50.

The side wall 64 of the closure 40 has a cylindrical configuration centered on the axis 50. The outer diameter of the side wall 64 of the closure 40 is approximately equal to the inner diameter of the side wall 44 of the diffuser 30. The closure 40 is nested inside the upper housing part 30, as. seen in FIG. 2. The side wall 64 of the closure 40 is welded to the side wall 44 of the upper housing part 30 with a single, continuous weld 72.

The inflator 10 includes an igniter assembly 80. The igniter assembly 80 includes an igniter housing 82. The igniter housing 82 has a generally tubular configuration including a tapered, axially extending side wall 84, an end portion 86, and a flange 88.

The igniter housing 82 has an ignition chamber 90 radially inward of the side wall. A circular array of ports or passages 87 is formed in the side wall 84. The passages 87 extend between the ignition chamber 90 and the exterior of the igniter housing 82. The radially outer ends of the passages 87 are covered by adhesive foil 89. The end portion 86 of the igniter housing 82 is disposed at one end of the side wall 84 and extends into the central opening. 68 in the end wall 62 of the closure 40.

The igniter assembly 80 includes an initiator 92. The initiator 92 is a known device which is electrically actuatable by an electric current applied through terminals 94 to generate combustion products. A sleeve 96 is press fit between the initiator 92 and the side wall 84 of the igniter housing 82 to secure the initiator in position in the housing.

An ignition material 98 is located in the ignition chamber 90 of the igniter housing 82, adjacent to and in contact with the initiator 92. The ignition material 98 is a known material which is ignitable by the initiator 92 and which, when ignited, generates combustion products. One suitable material is boron potassium nitrate, or $BKNO_3$.

The ignition material 98 also includes an autoignition material for actuating the inflator 10 in the event of excessive ambient temperature. The autoignition material in the ignition material 98 is preferably provided in a powder form, commingled with the ignition material itself. The autoignition material is a known autoignition material which autoignites when exposed to a predetermined temperature. The autoignition material in the ignition material 98 autoignites at a lower temperature than the ignition material itself.

The igniter assembly 80 includes a metal igniter cap 100 on the upper end of the igniter housing 82. The igniter cap 100 contains the ignition material 98 in the ignition chamber 90. The igniter cap 100 has an axially extending, cylindrical portion 102 which is press fit inside the side wall 84 of the igniter housing 82. A radially extending end wall 104 of the igniter cap 100 extends across and closes the ignition chamber 90 in the igniter housing 82.

The flange 88 of the igniter housing 82 extends radially outward from the side wall 84 of the igniter housing. The flange 88 overlies the radially inner portion of the end wall 62 of the closure 40. If desired, a seal (not shown), such as a gasket or a layer of sealant material, may be provided between the flange 88 of the igniter housing 82 and the end wall 62 of the closure 40.

The inflator 10 includes a first flow control member 110 in the form of a combustor or combustion cup 110. The combustion cup 110 has an annular configuration including a radially extending lower end wall 112 and an axially extending side wall 114. The side wall 114 has an inner side surface 115. A ring-shaped propellant chamber or combustion chamber 116 is defined inside the combustion cup. The radially outer boundary of the propellant chamber 116 is the side wall 114 of the combustion cup 110. The radially inner boundary of the propellant chamber 116 is the side wall 84 of the igniter housing 82.

The side wall 114 of the combustion cup 110 is disposed radially inward of the side walls 44 and 64 of the diffuser 30 and closure 40, respectively. The combustion cup side wall 114 has a ring-shaped upper end surface 120. The upper end surface 120 has a generally frustoconical configuration which seals against the inner side surface 46 of the end wall 42 of the upper housing part 30.

The lower end wall 112 of the combustion cup 110 extends radially inward from the lower portion of the side wall 114 of the combustion cup. The lower end wall 112 has an inner side surface 122 which is presented toward the upper housing part 30. The lower end wall 112 has an outer side surface 124 which is in abutting engagement with the inner side surface 66 of the end wall 62 of the closure 40. The axial length of the combustion cup 110 is selected so that the combustion cup is trapped or captured axially between the upper housing part 30 and the closure 40.

The upper end surface 120 of the combustion cup side wall 114 and the inner side surface 46 of the upper housing part 30 define a fluid passage 130 (FIGS. 2–3) in the inflator 10. Because the combustion cup side wall 114 is cylindrical, the fluid passage 130 has an annular configuration extending around and centered on the axis 50. The fluid passage 130 is located between the combustion chamber 116 and the fluid outlets 52. The fluid passage 130, which is normally closed, opens upon actuation of the inflator 10 as described below.

The lower end wall 112 of the combustion cup 110 has a ring-shaped end surface 126. The end surface 126 of the lower end wall 112 of the combustion cup 110 is disposed adjacent to the flange 88 of the igniter housing 82. The igniter housing 82 helps to locate the combustion cup 110 radially in the inflator 10.

The inflator 10 includes an actuatable inflation fluid source 140 in the form of a solid propellant. The propellant 140 is located in the combustion chamber 116 in the combustion cup 110. The propellant 140 is a known material which is ignitable by the igniter assembly 80 and which, when ignited, produces inflation fluid in the form of gas under pressure for inflating the air bag 14. The propellant 140 is illustrated as being provided in the form of discs. (For clarity in FIG. 2, the propellant discs 140 are not shown in some areas of the combustion chamber 116.) The propellant 140 could, alternatively, be provided in the form of pellets or tablets, or as large discs encircling the igniter housing 82.

The inflator 10 includes a propellant retainer 150 in the combustion chamber 116. The propellant retainer 150 is a ring-shaped metal plate having a plurality of perforations 152. The propellant retainer 150 is disposed in the combustion chamber 116 and extends radially between the side wall 84 of the igniter housing 82 and the side wall 114 of the combustion cup 110. The propellant retainer 150 divides the combustion chamber 116 into an annular first part 158, located between the propellant retainer and the closure 40, and an annular second part 159, located between the propellant retainer and the diffuser 30.

The inflator 10 also includes a combustor heat sink 160 in the combustion chamber 116. The heat sink 160 has an annular configuration extending around an upper end portion of the side wall 84 of the igniter housing 82. The heat sink 160 is formed as a knitted stainless steel wire tube which is compressed to the frustoconical shape illustrated in the drawings.

The inflator 10 includes a second fluid flow control member in the form of a threshold cap 180. The threshold cap 180 is disposed in the combustion chamber 116, and is located axially between the igniter cap 100 and the diffuser 30. The threshold cap 180 is made from stamped sheet metal, preferably aluminum, substantially thinner than the housing parts 30 and 40.

The threshold cap 180 (FIG. 2) is shaped generally like a throwing disc and has a domed main body portion or central wall 182 centered on the axis 50. The central wall 182 has a circular configuration including an annular outer edge portion 184. The central wall 182 has parallel inner and outer side surfaces 186 and 188.

An annular side wall 190 of the threshold cap 180 extends generally axially from the central wall 182. The side wall 190 of the threshold cap 180 includes a first portion 192 which is connected with and extends from the outer edge portion 184 of the central wall 182 of the threshold cap. The first portion 192 has a slightly frustoconical configuration, extending radially outward from the central wall 182 as it extends axially away from the central wall 182. In the illustrated embodiment, the first portion 192 of the side wall 190 extends at a small angle (about 5 degrees) to the axis 50. A second portion 194 of the side wall 190 of the threshold cap 180 extends axially downward and radially inward from the first portion 192.

The threshold cap 180 has a plurality of openings in the form of slots 200. The slots 200 extend between the inner and outer side surfaces 196 and 198 of the side wall 190 of the threshold cap 180. The slots 200 are spaced apart equally along the side wall 190, in a circular array centered on the axis 50. Each one of the slots 200 has a respective upper edge 202.

The slots 200 in the threshold cap 180 together form a fluid flow control passage 210 in the threshold cap. In the illustrated embodiment, the threshold cap 180 has six slots 200. A greater or lesser number of slots 200 may be provided to obtain the desired flow control characteristics of the inflator 10.

The threshold cap 180 (FIG. 2) is disposed in the combustion chamber 116 in the inflator 10, at a location centered on the axis 50. The inner side surface 186 of the central wall 182 of the threshold cap 180 is in abutting engagement with the end wall 104 of the igniter cap 100. The central portion of the outer side surface 188 of the central wall 182 of the threshold cap 180 is in abutting engagement with the inner side surface 46 of the central wall 32 of the diffuser 30.

The threshold cap 180 extends across the entire combustion chamber 116 of the inflator 10. The outer side surface 198 of the side wall 190 of the threshold cap 180 is in abutting engagement with the inner side surface 115 of the side wall 114 of the combustion cup 110, near the fluid passage 130.

The combustor heat sink 160 is compressed axially between the threshold cap 180 and the propellant retainer 150. The combustor heat sink 160 acts as a spring, pressing the propellant retainer 150 against the propellant 140. The combustor heat sink 160 holds the propellant retainer 150 from vibrating. The conical shape of the heat sink 160 makes the heat sink resilient. The resilience of the heat sink 160 eliminates deformation of the parts of the inflator 10 and crushing of the propellant 140 during assembly.

The igniter assembly 80 is trapped or captured axially between the threshold cap 180 and the closure 40. Specifically, the distance between the igniter cap 100 and the flange 88 of the igniter housing 82 is selected so that, when the housing parts 30 and 40 are welded together with the igniter assembly 80 inside, the end wall 104 of the igniter cap engages the inner side surface 186 of the central wall 182 of the threshold cap 180. The igniter housing 82 is pressed axially into engagement with the closure 40. The flange 88 of the igniter housing 82 is pressed axially outward against or toward the end wall 62 of the closure 40.

The igniter cap serves to conduct heat between the exterior of the inflator and the autoignition material in the ignition material 98. The central wall of the metal igniter cap is in direct thermal contact with the central wall of the metal threshold cap. The central wall of the threshold cap is in direct thermal contact with the metal diffuser. As a result, heat from the exterior of the diffuser is transmitted into the igniter cap. This heat is conducted into the ignition material 98 inside the igniter cap, which includes autoignition material. This heat is also conducted through the side wall of the igniter cap into the side wall of the igniter housing and thence into the ignition material 98 which includes autoignition material.

Prior to actuation of the inflator 10, the end surface 120 of the combustion cup side wall 114 seals against the inner side surface 46 of the diffuser end wall 42, so that the fluid passage 130 is closed and has zero flow area. The closed fluid passage 130 blocks fluid flow between the combustion chamber 116 and the fluid outlets 52, prior to actuation of the inflator 10. There is no other path for any significant amount of fluid to flow between the inflation fluid source 140 and the fluid outlets 52. Upon actuation of the inflator 10, as described below, the fluid passage 130 opens to enable inflation fluid to flow between the inflation fluid source 140 and the fluid outlets 52. The fluid passage 130, when open, has a smaller flow area than the fluid outlets 52 in the diffuser 30.

Prior to actuation of the inflator 10, the control passage 210 in the threshold cap 180 is also in a closed condition. The slight angle between the side wall 114 of the combustion cup 110 and the first portion 192 of the side wall 190 of the threshold cap 180 ensures that the slots 200 in the threshold cap are almost completely covered by the side wall of the combustion cup. There is initially no significant gap between the side wall 190 of the threshold cap 180 and the side wall 114 of the combustion cup 110. The threshold cap 180 substantially blocks fluid flow between the combustion chamber 116 and the fluid passage 130. Upon actuation of the inflator 10, as described below, the threshold cap 180 moves and deforms to enable inflation fluid to flow through the slots 200.

In the event of a vehicle crash at or above the predetermined threshold level of crash severity, the inflator 10 is actuated by an electric signal applied to the terminals 94 of the initiator 92. The initiator 92 is actuated and ignites the ignition material 98. The ignition material 98 produces combustion products which rupture the foil 89 and flow through the passages 87 into the combustion chamber 116, as indicated by the arrows in FIG. 3. The igniter cap 100 during this time provides a seal to block flow of the combustion products out of the upper end of the igniter housing 82.

The combustion products flowing into the combustion chamber 116 ignite the propellant 140. The propellant 140 combusts and produces inflation fluid under pressure in the combustion chamber 116. The pressure in the combustion chamber 116 rises rapidly to a pressure in the range of about 1,000 psi to about 2,000 psi or more.

The material thickness of the housing 20 is selected so that the end walls 42 and 62 deform because of the pressure of inflation fluid in the housing upon actuation of the inflation fluid source 140. Specifically, the end wall 42 of the diffuser 30 deforms axially outward (in an upward direction as viewed in FIG. 3), from the condition shown in FIG. 2 to the condition shown in FIG. 3. Simultaneously, the end wall 62 of the closure 40 deforms axially outward in the opposite direction, from the condition shown in FIG. 2 to the condition shown in FIG. 3. The amount of deformation or deflection of the end walls 42 and 62 is dependent on the pressure in the housing 20. That is, the higher the pressure in the housing, the more the end walls 42 and 62 deflect outward.

As the diffuser 30 and closure 40 move away from each other, the fluid pressure on the inner side surface 186 of the threshold cap 180 causes the threshold cap to move with the diffuser, away from the closure. At the same time, the heat sink 160 and the propellant retainer 150 also move with the diffuser 30, away from the closure 40. This movement of the threshold cap 180 opens the control passage 210, as described below in detail, to enable fluid to flow out of the combustion chamber 116 through the fluid passage 130.

The pressure of the inflation fluid acting on the igniter housing flange 88 forces the flange against the end wall 62 of the closure 40. The force exerted by the inflation fluid on the flange 88 effects a fluid-tight seal between the igniter housing 82 and the closure 40.

As a result of the deformation of the end walls 42 and 62 of the housing parts 30 and 40, the distance between the end wall of the diffuser and the end wall of the closure increases. The force of the combustion products of the ignition material 98 causes the side wall 102 of the igniter cap 100 to slide axially along the side wall 84 of the igniter housing 82, with the threshold cap 180 and the diffuser, in a direction away from the closure 40. The side wall 102 of the igniter cap 100 remains in sealing engagement with the side wall 84 of the igniter housing 82.

When the inflator housing 20 deforms, the combustion cup 110 is no longer trapped axially between the diffuser 30 and the closure 40. The pressure of the inflation fluid in the combustion chamber 116, acting in a downward direction (as viewed in FIG. 3) on the lower portion 112 of the combustion cup 110, holds the combustion cup in engagement with the end wall 62 of the closure 40. The combustion cup 110 moves with the end wall 62 of the closure 40, away from the end wall 42 of the diffuser 30.

The upper end surface 120 of the combustion cup 110 moves away from the inner side surface 46 of the end wall 42 of the diffuser 30. The fluid passage 130 opens and its flow area increases, because of the deformation of the housing 20. The side wall 84 of the igniter housing 82, the igniter housing flange 88, the combustion cup 110, and the threshold cap 180 cooperate to direct all, or substantially all, of the inflation fluid flowing out of the combustion chamber 116 to flow through the fluid passage 130. There is no other path for any significant amount of fluid to flow between the inflation fluid source 140 and the fluid outlets 52.

The heat sink 160 cools and filters the inflation fluid flowing out of the combustion chamber 116. The heat sink 160 also filters particulate matter out of the inflation fluid. The propellant retainer 150 reduces toxic effluent of the combustion process by increasing the completeness of combustion of the propellant 140. It is believed that this occurs because liquid intermediates of the propellant combustion are prevented from embedding in, and being quenched or extinguished by, the heat sink 160.

The inflation fluid flows out of the combustion chamber 110, through the slots 200 in the threshold cap 180, and toward the fluid passage 130. Inflation fluid flows through the fluid passage 130, through a final filter 220, and toward the inflation fluid outlets 52. The inflation fluid flows out of the combustion chamber 116 along the entire 360° extent of the fluid passage 130. The fluid outlets 52 direct the inflation fluid to flow out of the housing 20 to the inflatable device 14.

The flow area of the fluid passage 130 in the housing 20 varies in accordance with the pressure of inflation fluid in the housing 20. Specifically, the higher the pressure in the housing 20, the more the end walls 42 and 62 deflect or deform outward. The more the end walls 42 and 62 deflect outward, the more the end surface 120 of the combustion cup 110 moves away from the end wall of the diffuser 30, and the bigger the fluid passage 130 becomes. In one embodiment, the fluid passage 130 is typically about one-half millimeter in axial extent when the inflator 10 is actuated. Under extreme pressure conditions, the fluid passage 130 could have an axial extent of as much as two to three millimeters.

As the housing 20 deforms, the slots 200 in the threshold cap 180 progressively open, but the fluid passage 130 between the diffuser 30 and the combustion cup 110 opens faster. Thus, the fluid flow area through the slots 200 in the threshold cap 180 almost immediately becomes smaller than the fluid flow area through the gap or fluid passage 130 between the combustion cup 110 and the diffuser 30. Thus, the threshold cap 180 acts as a restrictor, or control, for the rate of fluid flow out of the inflator 10.

The flow area of the slots 200 in the threshold cap 180, which make up the control passage 210, also varies in accordance with the pressure of inflation fluid in the housing 20. Specifically, the higher the pressure in the housing 20, the more the threshold cap 180 moves away from the closure 40. In addition, the outer edge portion 184 of the central wall 182 of the threshold cap 180 flattens against the end wall 32 of the diffuser 30. As a result, a greater portion of each one of the slots 200 in the threshold cap 180 is exposed, and the control passage 210 becomes bigger.

Because the flow area of the control passage 210 varies in accordance with the pressure of inflation fluid in the housing 20, the internal operating pressure of the inflator 10 is self-regulating. Any increased pressure in the combustion chamber 116 causes the control passage 210 to open further, thus allowing the pressure to be relieved and lowered. The range of peak operating pressures in the inflator 10 is, therefore, narrowed, reducing the structural requirements of the inflator housing 20 accordingly.

Controlling fluid flow in this manner, that is, through movement of the slotted threshold cap 180, is more precise than controlling fluid flow with the gap 130 between the two deforming housing parts 30 and 110. In addition, it is relatively easy to vary the fluid flow characteristics for different inflators, by providing different threshold caps 180 having different opening sizes or configurations.

Because the peak pressures in the combustion chamber 116 are reduced by the increased opening of the variable control passage 210, effects of temperature change on the pressure in the combustion chamber 116 are minimized. This can enable the use of a propellant 140 which is more pressure sensitive, that is, which has a higher burn rate exponent.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, comprising:

an inflator housing including first and second end walls;

an inflation fluid source in said inflator housing actuatable to provide inflation fluid under pressure;

an igniter assembly in said inflator housing for actuating said inflation fluid source, said igniter assembly including an igniter housing located between said first and second end walls of said inflator housing and an igniter located in said igniter housing for actuating said inflation fluid source;

a flow control member in said housing having openings which are movable upon actuation of said inflation fluid source to control flow of inflation fluid out of said housing;

said first and second end walls of said inflator housing moving away from each other upon actuation of said inflation fluid source, said igniter housing moving with said second end wall away from said first end wall, said flow control member moving with said first end wall away from said second end wall; and said igniter assembly further including a cap on said igniter housing for closing an open end of said igniter housing, said cap contacting said flow control member and bodily moving with said flow control member and said first end wall away from said second end wall and relative to said igniter housing upon actuation of said inflation fluid source.

2. An apparatus as set forth in claim 1 wherein said cap slides along said igniter housing upon actuation of said inflation fluid source.

3. An apparatus as set forth in claim 2 wherein said igniter comprises a combustible ignition material, said igniter cap blocking flow of combustion products of said ignition material out of said open end of said igniter housing upon actuation of said igniter.

4. An apparatus as set forth in claim 1 wherein said igniter cap remains in sealing engagement with said igniter housing upon actuation of said igniter.

5. An apparatus as set forth in claim 1 wherein said igniter cap has an end wall and a side wall, said side wall extending inside said igniter housing.

6. An apparatus as set forth in claim 4 wherein said igniter cap side wall slides along said igniter housing and remains in sealing engagement with said igniter housing upon actuation of said inflation fluid source.

7. An apparatus as set forth in claim 1 wherein said igniter comprises a combustible ignition material, said cap enclosing said combustible ignition material including an autoignition material in said igniter housing, said cap being in thermal contact with an exterior portion of said housing to enable transmission of heat from the exterior of said apparatus to said autoignition material.

\* \* \* \* \*

UNITED STATES PATENT AND TRADEMARK OFFICE
CERTIFICATE OF CORRECTION

PATENT NO.    : 6,290,256 B1
DATED         : September 18, 2001
INVENTOR(S)   : Eric R. McFarland et al.

It is certified that error appears in the above-identified patent and that said Letters Patent is hereby corrected as shown below:

<u>Column 10,</u>
Line 23, change "4" to -- 5 --.

Signed and Sealed this

Twentieth Day of August, 2002

Attest:

JAMES E. ROGAN
Attesting Officer — Director of the United States Patent and Trademark Office